United States Patent
Takanashi et al.

(10) Patent No.: US 9,876,222 B2
(45) Date of Patent: *Jan. 23, 2018

(54) NONAQUEOUS ELECTROLYTE SECONDARY BATTERY

(71) Applicant: SANYO Electric Co., Ltd., Daito-shi, Osaka (JP)

(72) Inventors: Yuu Takanashi, Daito (JP); Kazuhiro Hasegawa, Daito (JP); Sho Tsuruta, Daito (JP); Atsushi Fukui, Daito (JP)

(73) Assignee: SANYO Electric Co., Ltd., Osaka (JP)

( * ) Notice: Subject to any disclaimer, the term of this patent is extended or adjusted under 35 U.S.C. 154(b) by 295 days.

This patent is subject to a terminal disclaimer.

(21) Appl. No.: 14/435,294

(22) PCT Filed: Sep. 10, 2013

(86) PCT No.: PCT/JP2013/005340
§ 371 (c)(1),
(2) Date: Apr. 13, 2015

(87) PCT Pub. No.: WO2014/068831
PCT Pub. Date: May 8, 2014

(65) Prior Publication Data
US 2015/0270533 A1    Sep. 24, 2015

(30) Foreign Application Priority Data
Oct. 31, 2012   (JP) ................................ 2012-240549

(51) Int. Cl.
| | | |
|---|---|---|
| H01M 4/36 | (2006.01) |
| C01G 53/00 | (2006.01) |
| C09C 1/00 | (2006.01) |
| H01M 4/505 | (2010.01) |
| H01M 4/525 | (2010.01) |
| H01M 10/052 | (2010.01) |
| H01M 10/0569 | (2010.01) |
| B82Y 30/00 | (2011.01) |
| H01M 4/131 | (2010.01) |
| H01M 4/485 | (2010.01) |
| H01M 4/56 | (2006.01) |
| H01M 10/0525 | (2010.01) |
| H01M 4/02 | (2006.01) |

(52) U.S. Cl.
CPC .............. *H01M 4/366* (2013.01); *B82Y 30/00* (2013.01); *C01G 53/50* (2013.01); *C09C 1/0081* (2013.01); *H01M 4/131* (2013.01); *H01M 4/485* (2013.01); *H01M 4/505* (2013.01); *H01M 4/525* (2013.01); *H01M 4/56* (2013.01); *H01M 10/052* (2013.01); *H01M 10/0525* (2013.01); *H01M 10/0569* (2013.01); *C01P 2002/50* (2013.01); *C01P 2004/03* (2013.01); *C01P 2004/64* (2013.01); *C01P 2004/80* (2013.01); *C01P 2006/40* (2013.01); *H01M 2004/027* (2013.01); *H01M 2004/028* (2013.01); *Y02T 10/7011* (2013.01)

(58) Field of Classification Search
CPC ...... H01M 4/366; H01M 4/131; H01M 4/505; H01M 4/525; H01M 4/52; H01M 10/0569; H01M 10/0525; H01M 2004/028; C01G 53/50
See application file for complete search history.

(56) References Cited

U.S. PATENT DOCUMENTS

| | | |
|---|---|---|
| 2008/0118839 A1 | 5/2008 | Yamamoto et al. |
| 2011/0117434 A1 | 5/2011 | Ogasawara et al. |
| 2011/0165460 A1 | 7/2011 | Jito et al. |
| 2013/0230770 A1 | 9/2013 | Oya et al. |
| 2013/0316227 A1 | 11/2013 | Nomura et al. |
| 2015/0056512 A1* | 2/2015 | Takeuchi ............... H01M 4/366 429/223 |
| 2015/0132666 A1* | 5/2015 | Ogata .................... H01M 4/366 429/338 |

FOREIGN PATENT DOCUMENTS

| | | |
|---|---|---|
| JP | 2008-123972 A | 5/2008 |
| JP | 2011-159619 A | 8/2011 |
| JP | 2012-054067 A | 3/2012 |
| WO | 2010/004973 A1 | 1/2010 |
| WO | 2012/067102 A1 | 5/2012 |
| WO | 2012/115263 A1 | 8/2012 |
| WO | WO 2013108571 * 7/2013 |

OTHER PUBLICATIONS

International Search Report dated Nov. 19, 2013, issued in corresponding application No. PCT/JP2013/005340.
Office Action dated May 5, 2016, issued in counterpart Chinese Patent Application No. 201380046911.1, with English translation. (13 pages).

* cited by examiner

*Primary Examiner* — Laura Weiner
(74) *Attorney, Agent, or Firm* — Westerman, Hattori, Daniels & Adrian, LLP

(57) ABSTRACT

A nonaqueous electrolyte secondary battery which can suppress the change in structure of a positive electrode active material at a high voltage is provided. The nonaqueous electrolyte secondary battery has a positive electrode including a positive electrode active material which absorbs and releases lithium ions; a negative electrode including a negative electrode active material which absorbs and releases lithium ions; and a nonaqueous electrolyte. The positive electrode active material has a surface to which a rare earth compound is adhered and includes a lithium cobalt composite oxide containing at least one type selected from the group consisting of Ni, Mn, Ca, Cu, Zn, Sr, Ge, Sn, Si, P, Nb, Mo, S, and W, and charge is performed so that the potential of the positive electrode is 4.53 V or more with reference to lithium.

3 Claims, 2 Drawing Sheets

NONAQUEOUS ELECTROLYTE SECONDARY BATTERY

TECHNICAL FIELD

The present invention relates to a nonaqueous electrolyte secondary battery having excellent battery characteristics even when a charge voltage is increased.

BACKGROUND ART

As drive power sources of mobile electronic apparatuses, such as a mobile phone including a smart phone, a mobile computer, a PDA, and a mobile music player, many nonaqueous electrolyte secondary batteries represented by a lithium ion battery have been widely used. Furthermore, many nonaqueous electrolyte secondary batteries have started to be used as power sources of electric vehicles (EV) and hybrid electric vehicles (HEV and PHEV) and also in stationary storage battery systems used, for example, for application to reduce the variation in output of solar energy generation, wind energy generation, and the like, and peak-shift application of system power control in which an electric power is stored during nighttime and is consumed during daytime.

In particular, since having various battery characteristics superior to those of other materials, a lithium cobalt composite oxide ($LiCoO_2$) and a foreign element-added lithium cobalt composite oxide in which Al, Mg, Ti, Zr, and/or the like is added have been widely used. However, cobalt is an expensive element, and in addition, the abundance thereof as the natural resource is very limited. Hence, in order to continuously use those lithium cobalt composite oxide and foreign element-added lithium cobalt composite oxide as a positive electrode active material of a nonaqueous electrolyte secondary battery, further improvement in performance thereof has been strongly desired.

As one method for improving the performance of a nonaqueous electrolyte secondary battery using a lithium cobalt composite oxide and/or a foreign element-added lithium cobalt composite oxide, there may be mentioned a method in which the charge voltage is increased from 4.3 V, which is a generally used potential, to approximately 4.6 V (each of which is a potential with reference to lithium). On the other hand, by the increase in charge voltage, problems in battery characteristics may occur in some cases, and hence, the measures therefor are required.

Patent Document 1 has disclosed a nonaqueous electrolyte secondary battery in which when the battery is charged for use so that a positive electrode potential exceeds 4.3 V with reference to lithium, in order to suppress elution of cobalt and decomposition of an electrolyte liquid, a positive electrode is used which includes lithium phosphate and a positive electrode active material containing a lithium cobaltate to which at least one type of Mg, Al, Ti, and Zr is added.

Patent Document 2 has disclosed a nonaqueous electrolyte secondary battery in which when the charge voltage is increased, in order to suppress a reaction between a nonaqueous electrolyte liquid and a positive electrode active material by improvement thereof, a positive electrode active material is used which includes positive electrode active material grains each containing lithium and grains of a compound, such as erbium hydroxide or erbium oxyhydroxide, adhered in a dispersed state to the surfaces of the above active material grains.

In order to obtain a battery having a high capacity, excellent continuous charge storage characteristics, and excellent cycle characteristics, Patent Document 3 has disclosed a nonaqueous electrolyte secondary battery configured to comprise a positive electrode active material which includes a lithium transition metal composite oxide containing lithium and cobalt and having a layered structure and fine grains of at least one of a hydroxide and an oxyhydroxide of a rare earth element adhered to the surface of the composite oxide; a positive electrode active material which includes a lithium transition metal composite oxide containing lithium and cobalt and having a layered structure and no fine grains of a rare earth element compound adhered to the surface of the composite oxide; and lithium phosphate.

CITATION LIST

Patent Document

Patent Document 1: Japanese Published Unexamined Patent Application No. 2008-123972
Patent Document 2: WO2010/004973
Patent Document 3: Japanese Published Unexamined Patent Application No. 2012-54067

SUMMARY OF INVENTION

Technical Problem

However, in the case in which a lithium cobalt composite oxide is used for the positive electrode active material, and the charge voltage is increased so that the potential of the positive electrode is 4.53 V or more with reference to lithium, the phase transition of the crystalline structure of the surface and the inside of the positive electrode active material occurs from the O3 structure to the H1-3 structure, and by this phase transition, the cycle characteristics are degraded. The above Patent Documents 1 to 3 have not suggested at all that when the potential of the positive electrode is increased to 4.53 V or more with reference to lithium, the phase transition occurs in the positive electrode active material.

According to one aspect of the present invention, it is aimed to provide a long-life nonaqueous electrolyte secondary battery in which even when the charge potential is set to high, such as 4.53 V or more, with reference to lithium, the change in structure of the positive electrode active material can be suppressed.

Solution to Problem

A nonaqueous electrolyte secondary battery according to one aspect of the present invention comprises: a positive electrode including a positive electrode active material which absorbs and releases lithium ions; a negative electrode including a negative electrode active material which absorbs and releases lithium ions; and a nonaqueous electrolyte. The above positive electrode active material includes a lithium cobalt composite oxide containing at least one type selected from the group consisting of Ni, Mn, Ca, Cu, Zn, Sr, Ge, Sn, Si, P, Nb, Mo, S, and W and has a surface to which a rare earth compound is partially adhered, and charge is performed so that the potential of the positive electrode is 4.53 V or more with reference to lithium. In addition, the charge potential may be set to 4.55 V or more with reference to lithium.

Advantageous Effects of Invention

According to the nonaqueous electrolyte secondary battery of one aspect of the present invention, a long-life nonaqueous electrolyte secondary battery can be obtained in which at a high charge voltage, such as 4.53 V or more or, further, 4.55 V or more, with reference to lithium, the change in structure of the positive electrode active material can be suppressed.

DESCRIPTION OF EMBODIMENTS

Hereinafter, embodiments of the present invention will be described in detail. However, the following embodiments will be described by way of example to embody the technical scope of the present invention and are not intended to limit the present invention. The present invention may also be equally applied to various changes and modifications performed without departing from the technical scope disclosed in the claims. First, a concrete method for manufacturing a positive electrode used in each of Experimental Examples 1 to 14 will be described.

[Formation of Positive Electrode]

A positive electrode active material was formed as described below. As a lithium source, lithium carbonate ($Li_2CO_3$) was used, as a cobalt source, cobalt tetraoxide ($Co_3O_4$) was used, and as a nickel source and a manganese source, each of which was used as a substituent element source for cobalt, nickel hydroxide ($Ni(OH)_2$) and manganese dioxide ($MnO_2$) were used. After $Co_3O_4$, ($Ni(OH)_2$), and $MnO_2$ were dry-mixed at a chemical stoichiometric ratio so as to obtain $LiCo_{0.90}Ni_{0.05}Mn_{0.05}O_2$ (Co:Ni:Mn=90:5:5), this mixture was mixed with $Li_2CO_3$ so as to form $LiCo_{0.90}Ni_{0.05}Mn_{0.05}O_2$ (Co:Ni:Mn=90:5:5). This mixed powder was formed into pellets and then fired at 900° C. for 24 hours in an air atmosphere, so that a positive electrode active material A represented by $LiCo_{0.90}Ni_{0.05}Mn_{0.05}O_2$ was prepared. This positive electrode active material A was used as a positive electrode active material of each of Experimental Examples 2, 6, and 9.

Figure 1:
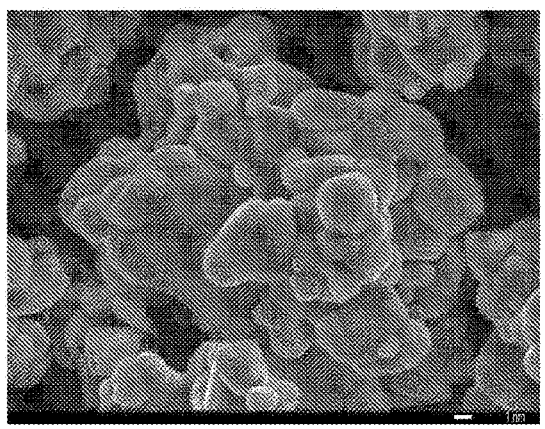
FIG. 1 is a SEM image of a positive electrode active material A.
Figure 2:
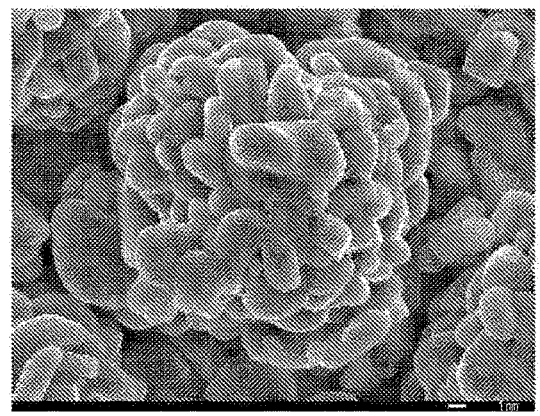
FIG. 2 is a SEM image of a positive electrode active material A'.

A scanning electron microscope (SEM) photo of the positive electrode active material A thus prepared is shown in FIG. 1. In addition, for the purpose of reference, a SEM photo of a positive electrode active material A' is shown in FIG. 2 which was prepared so as to have the same composition as that of the positive electrode active material A except that a nickel manganese co-precipitated hydroxide is used as the substituent element source for cobalt. When the photo of FIG. 1 is compared to that of FIG. 2, it is found that a primary grain diameter of the positive electrode active material A synthesized by dry mixing of nickel hydroxide and manganese dioxide is larger than that of the positive electrode active material A' synthesized using a nickel manganese co-precipitated hydroxide. Hence, compared to the case in which the positive electrode active material synthesized by a co-precipitation method is used, when the positive electrode active material synthesized by a solid phase method is used, a reaction area of the surface of the positive electrode during charge and discharge is decreased, and the cycle characteristics are suppressed from being degraded.

In addition, in the positive electrode active material synthesized by a solid phase method, a solid solution reaction among the lithium source, the cobalt source, and the substituent element source for cobalt is not likely to occur as compared to the case of the positive electrode active material synthesized by a co-precipitation method, and as a result, the substituent element source for cobalt is likely to be present at a surface side of the positive electrode active material. By a charge discharge reaction at a high voltage of 4.53 V or more with reference to lithium, the collapse of a crystal structure is liable to occur in the vicinity of the surface of the positive electrode active material. Hence, when the positive electrode active material is synthesized by a solid phase method so that the substituent element source for cobalt is more effectively present in the vicinity of the surface of this positive electrode active material, the collapse of the crystal structure at a high voltage associated with a charge discharge reaction can be further suppressed.

In addition, except that the chemical stoichiometric ratio among cobalt tetraoxide ($Co_2O_4$), nickel hydroxide ($Ni(OH)_2$), and manganese dioxide ($MnO_2$) was changed, a positive electrode active material B and a positive electrode active material C were prepared in a manner similar to that of the positive electrode active material A. The molecular formula of the positive electrode active material B is $LiCO_{0.80}Ni_{0.10}Mn_{0.10}O_2$ (Co:Ni:Mn=80:10:10), and the molecular formula of the positive electrode active material C is $LiCO_{0.70}Ni_{0.15}Mn_{0.15}O_2$ (Co:Ni:Mn=70:15:15). The positive electrode active material B was used in Experimental Examples 3, 7, and 10 as the positive electrode active material. The positive electrode active material C was used in Experimental Examples 4 and 11 to 14 as the positive electrode active material.

In addition, except that nickel hydroxide ($Ni(OH)_2$) and manganese dioxide ($MnO_2$) were not used, a positive electrode active material D represented by the molecular formula $LiCoO_2$ was prepared in a manner similar to that of the positive electrode active material A. The positive electrode active material D was used in Experimental Examples 1, 5, and 8 as the positive electrode active material.

A rare earth compound was adhered to the surface of each of the positive electrode active materials A to D by a wet method as described below. A mixture of 1,000 g of the positive electrode active material and 3 liters of purified water was stirred, so that a dispersion liquid in which the positive electrode active material was dispersed was prepared. While an aqueous sodium hydroxide solution was added so as to maintain the pH of the dispersion liquid at 9, a solution in which 1.85 g of erbium nitrate pentahydrate functioning as a rare earth compound source was added to this dispersion liquid. In addition, when the pH of the dispersion liquid is lower than 9, erbium hydroxide and erbium oxyhydroxide are not likely to be precipitated. In addition, when the pH of the dispersion liquid is higher than 9, a reaction rate of the precipitation of the erbium compound is increased, and a dispersion state thereof to the surface of the positive electrode active material becomes uneven.

Next, suction filtration of the dispersion liquid was performed followed by water washing, and a powder obtained thereby was processed by a heat treatment (drying) at 120° C. Accordingly, a positive electrode active material powder in which erbium hydroxide was uniformly adhered to the surface of the positive electrode active material was obtained.

Figure 3:
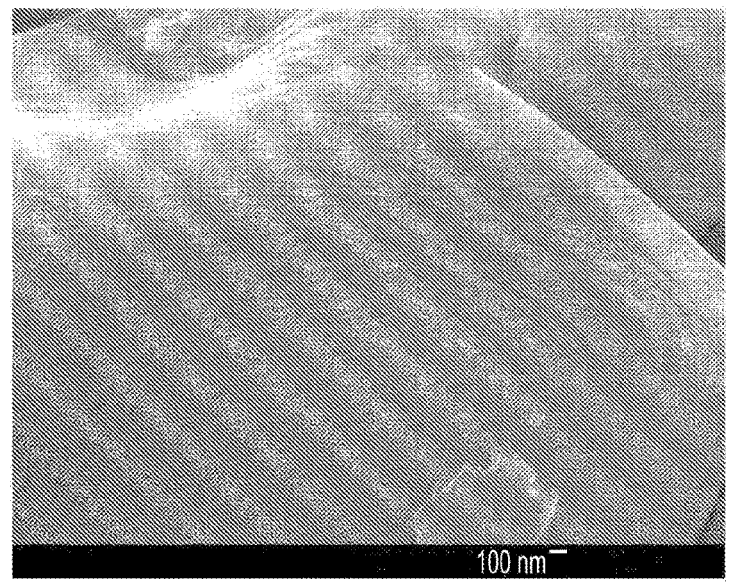
FIG. 3 is a SEM image of a positive electrode active material A having a surface to which a rare earth compound is adhered.

FIG. 3 shows a SEM image of the surface of the positive electrode active material A to which a rare earth compound is adhered. As shown in the figure, it was confirmed that an erbium compound (erbium hydroxide or erbium oxyhydroxide) was adhered in a uniformly dispersed state to the surface of the positive electrode active material. The average grain diameter of the erbium compound was 100 nm or less. In addition, the adhesion amount of this erbium compound obtained by a high frequency inductively-coupled plasma (ICP) spectroscopic analytical method was 0.07 parts by mass on the erbium element basis with respect to the positive electrode active material.

In addition, when fine grains of the rare earth compound are dispersedly adhered to the surface of the positive electrode active material, the change in positive electrode active material structure caused by a charge discharge reaction at a high potential can be suppressed. Although the reason for this has not been clearly understood, it is believed that when a hydroxide of a rare earth element is adhered to the surface of the positive electrode active material, a reaction overvoltage during charge is increased, and as a result, the change in crystal structure caused by the phase transition can be reduced.

A mixture was formed so as to contain 96.5 parts by mass of the positive electrode active material having a surface provided with the rare earth compound, which was prepared as described above, 1.5 parts by mass of acetylene black functioning as an electrically conductive agent, and 2.0 parts by mass of a poly(vinylidene fluoride) (PVdF) powder functioning as a binder, and this mixture was further mixed with a N-methylpyrrolidone (NMP) solution, so that a positive electrode mixture slurry was prepared. Next, after the positive electrode mixture slurry was applied by a doctor blade method to two surfaces of aluminum foil (thickness: 15 μm) functioning as a positive electrode collector to form positive electrode active material mixture layers on the two surfaces of the positive electrode collector and was then dried, rolling was performed using compression rollers, and a positive electrode plate was then formed by cutting to have a predetermined size. Subsequently, an aluminum tab functioning as a positive electrode collector tab was fitted to a part of the positive electrode plate at which the positive electrode active material mixture layer was not formed, so that a positive electrode was formed. The amount of the positive electrode active material mixture layer was set to 39 mg/cm$^2$, and the thickness of the positive electrode mixture layer was set to 110 μm.

[Preparation of Nonaqueous Electrolyte]

As a nonaqueous solvent, fluoroethylene carbonate (FEC), fluorinated propionic carbonate (FMP), fluorinated ethyl methyl carbonate (F-EMC), ethylene carbonate (EC), and ethyl methyl carbonate (EMC) were prepared. In each of Experimental Examples 1 to 14, on the volume basis at 25° C., a mixture of EC and EMC at a ratio of 30:70 (Experimental Examples 1 to 10), a mixture of FEC and EMC at a ratio of 20:80 (Experimental Example 11), a mixture of FEC, FMP, and EMC at a ratio of 20:40:40 (Experimental Example 12), a mixture of FEC and FMP at a ratio of 20:80 (Experimental Example 13), and a mixture of FEC and F-EMC at a ratio of 20:80 (Experimental Example 14) were prepared. In addition, lithium hexafluorophosphate (LiPF$_6$) was dissolved in this nonaqueous solvent to have a concentration of 1 mol/L, so that a nonaqueous electrolyte was prepared.

[Formation of Monopolar Cell]

Figure 4:
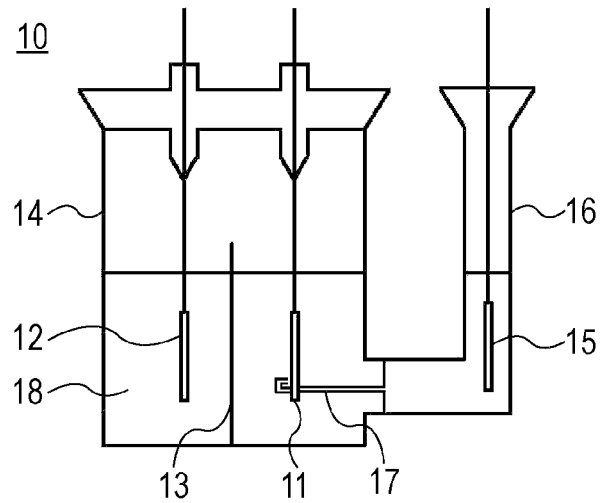
FIG. 4 is a schematic view of a monopolar cell.

Next, the evaluation of the positive electrode active material and the nonaqueous electrolyte using a monopolar cell will be described. A monopolar cell 10 is configured as shown in FIG. 4 to have a measurement bath 14 in which a positive electrode 11, a negative electrode (counter electrode) 12, and a separator 13 are arranged and a reference electrode bath 16 in which a reference electrode 15 is arranged. From the reference electrode bath 16, a capillary tube 17 is arranged so as to extend to the vicinity of the surface of the positive electrode 11. A nonaqueous electrolyte liquid 18 is filled in the measurement bath 14 and the reference electrode bath 16. The negative electrode 12 and the reference electrode 15 are each formed from a lithium metal. The negative electrode 12 has a dimension capable of facing the positive electrode 11. The theoretical capacity of the monopolar cell 10 thus formed is 100 mAh.

[Charge Discharge Test]

Charge was performed at a constant current of 0.15 It (=15 mA) until the potential of the positive electrode reached 4.60 V (Experimental Examples 1 to 4 and 11 to 14), 4.55 V (Experimental Examples 5 to 7), or 4.50 V (Experimental Examples 8 to 10) with reference to lithium, and charge was then further performed at a constant voltage corresponding to the above potential until the current reached 1/50 It (=2 mA). Subsequently, discharge was performed at a constant current of 0.15 It until the battery voltage reached 2.50 V, and the electrical quantity passing in this step was measured and regarded as an initial discharge capacity (mAh/g).

After charge and discharge were repeatedly performed under the same conditions as described above, a 20th discharge capacity was measured and regarded as a discharge capacity at a 20th cycle, and a capacity retention rate at a 20th cycle was obtained by the following equation. The results are collectively shown in Table 1.

Capacity retention rate (%)=(20th discharge capacity/initial discharge capacity)×100

TABLE 1

| | | Positive Electrode Active Material (Chemical Stoichiometric Ratio) | | | Nonaqueous Electrolyte (vol %) | | | | | Charge Voltage | Discharge Capacity (mAh/g) | | Capacity Retention |
|---|---|---|---|---|---|---|---|---|---|---|---|---|---|
| | | Co | Ni | Mn | FEC | FMP | F-EMC | EC | EMC | (V vs. Li) | Initial Stage | 20th Cycle | Rate (%) |
| Experimental Example 1 | D | 100 | 0 | 0 | 0 | 0 | 0 | 30 | 70 | 4.60 | 225 | 187 | 83 |
| Experimental Example 2 | A | 90 | 5 | 5 | 0 | 0 | 0 | 30 | 70 | 4.60 | 208 | 192 | 92 |

TABLE 1-continued

| | | Positive Electrode Active Material (Chemical Stoichiometric Ratio) | | | Nonaqueous Electrolyte (vol %) | | | | | Charge Voltage (V vs. Li) | Discharge Capacity (mAh/g) | | Capacity Retention Rate (%) |
|---|---|---|---|---|---|---|---|---|---|---|---|---|---|
| | | Co | Ni | Mn | FEC | FMP | F-EMC | EC | EMC | | Initial Stage | 20th Cycle | |
| Experimental Example 3 | B | 80 | 10 | 10 | 0 | 0 | 0 | 30 | 70 | 4.60 | 206 | 190 | 92 |
| Experimental Example 4 | C | 70 | 15 | 15 | 0 | 0 | 0 | 30 | 70 | 4.60 | 205 | 190 | 93 |
| Experimental Example 5 | D | 100 | 0 | 0 | 0 | 0 | 0 | 30 | 70 | 4.55 | 208 | 185 | 89 |
| Experimental Example 6 | A | 90 | 5 | 5 | 0 | 0 | 0 | 30 | 70 | 4.55 | 194 | 181 | 93 |
| Experimental Example 7 | B | 80 | 10 | 10 | 0 | 0 | 0 | 30 | 70 | 4.55 | 193 | 180 | 93 |
| Experimental Example 8 | D | 100 | 0 | 0 | 0 | 0 | 0 | 30 | 70 | 4.50 | 190 | 179 | 94 |
| Experimental Example 9 | A | 90 | 5 | 5 | 0 | 0 | 0 | 30 | 70 | 4.50 | 181 | 171 | 94 |
| Experimental Example 10 | B | 80 | 10 | 10 | 0 | 0 | 0 | 30 | 70 | 4.50 | 182 | 172 | 94 |
| Experimental Example 11 | C | 70 | 15 | 15 | 20 | 0 | 0 | 0 | 80 | 4.60 | 207 | 193 | 93 |
| Experimental Example 12 | C | 70 | 15 | 15 | 20 | 40 | 0 | 0 | 40 | 4.60 | 207 | 196 | 95 |
| Experimental Example 13 | C | 70 | 15 | 15 | 20 | 80 | 0 | 0 | 0 | 4.60 | 209 | 199 | 95 |
| Experimental Example 14 | C | 70 | 15 | 15 | 20 | 0 | 80 | 0 | 0 | 4.60 | 212 | 200 | 94 |

FEC: Fluoroethylene Carbonate
FEC: Fluoroethylene Carbonate
FMP: Fluorinated Methyl Propionate
F-EMC: Fluorinated Ethyl Methyl Carbonate
EC: Ethylene Carbonate
EMC: Ethyl methyl carbonate From Table 1, the following can be found. First, the results of Experimental Examples 1 to 4 are compared to each other. When charge is performed until the potential of the positive electrode reaches up to 4.60 V with reference to lithium, in Experimental Examples 2 to 4, the initial discharge capacity is high, such as 200 mAh/g or more, and the capacity retention rate is also high, such as 92% or more. On the other hand, in Experimental Example 1, although the initial discharge capacity is high, such as 200 mAh/g or more, the capacity retention rate is decreased to a low value of 83%. From the results described above, it is found that when charge is performed until the potential of the positive electrode reaches 4.60 V with reference to lithium, at least both of nickel and manganese are preferably contained in the lithium cobalt composite oxide.

The results of Experimental Examples 5 to 7 are compared to each other. When charge is performed until the potential of the positive electrode reaches 4.55 V with reference to lithium ions, in Experimental Examples 6 and 7, the initial discharge capacity is relatively high, such as more than 190 mAh/g, and the capacity retention rate is also high, such as 93% or more. On the other hand, in Experimental Example 5, although the initial discharge capacity is 200 mAh/g or more, the capacity retention rate is decreased to a low value of 89%.

The results of Experimental Examples 8 to 10 are reviewed. When charge is performed until the potential of the positive electrode reaches 4.50 V with reference to lithium, in Experimental Examples 9 and 10, although the initial discharge capacity is low, such as less than 190 mAh/g, the capacity retention rate is high, such as 94%. On the other hand, in Experimental Example 8, the initial discharge capacity is 190 mAh/g, and the capacity retention rate is high, such as 94%.

When the comparison is performed among the results of Experimental Examples 1, 5, and 8 in which the positive electrode active material D is used, the results of Experimental Examples 2, 6, and 9 in which the positive electrode active material B is used, and the results of Experimental Examples 3, 7, and 10 in which the positive electrode active material C is used, regardless of whether nickel and manganese are added in the positive electrode active material or not, as the charge end voltage of the positive electrode is decreased from 4.60 V to 4.50 V, although the initial discharge capacity is decreased, the capacity retention rate is improved. In addition, when the charge end voltage of the positive electrode is set to 4.50 V with reference to lithium, regardless of whether nickel and manganese are added in the positive electrode active material or not, the influence on the capacity retention rate disappears.

When the comparison is performed among the results of Experimental Examples 2 to 4, the results of Experimental Examples 6 and 7, and the results of Experimental Examples 9 and 10, regardless of whether the charge end voltage of the positive electrode is set to any one of 4.60 V to 4.50 V with reference to lithium, although the initial capacity is decreased as the contents of nickel and manganese in the positive electrode active material are increased, the influence on the capacity retention rate disappears.

When the results of Experimental Example 4 are compared to the results of Experimental Example 11, the discharge capacity of Experimental Example 11 is larger than that of Experimental Example 4, and the capacity retention rates thereof are approximately equivalent to each other. As the nonaqueous electrolyte, although FEC, which is a fluorinated solvent, is contained in Experimental Example 11, no FEC is contained in Experimental Example 4. Hence, it is found that when a fluorinated solvent is contained in the nonaqueous electrolyte, a high discharge capacity can be obtained, and in addition, the cycle characteristics can be suppressed from being degraded.

When the results of Experimental Examples 11 to 13 are compared to each other, the initial discharge capacity of Experimental Example 11 is equivalent to that of Experimental Example 12, and the initial discharge capacity of Experimental Example 13 is larger than that of each of Experimental Examples 11 and 12. In addition, the capacity retention rate of each of Experimental Examples 12 and 13 is larger than that of Experimental Example 11. The content of the fluorinated solvent in the nonaqueous electrolyte is increased from Experimental Examples 11, 12, and 13 in this order. Hence, it is found that as the content of the fluorinated solvent contained in the nonaqueous electrolyte is increased, the discharge capacity and the capacity retention rate tend to increase. It is found that the nonaqueous electrolyte preferably contains 50 percent by volume or more of a fluorinated solvent and further preferably 60 percent by volume or more thereof.

When the results of Experimental Example 13 are compared to the results of Experimental Example 14, the initial discharge capacity of Experimental Example 14 is larger than that of Experimental Example 13, and the capacity retention rate of Experimental Example 14 is equivalent to that of Experimental Example 13. As the nonaqueous electrolyte, although FMP is contained in Experimental Example 14, F-EMC is contained in Experimental Example 13. Hence, it is found that in the nonaqueous electrolyte, F-EMC is more preferably contained as compared to FMP.

[Formation of Nonaqueous Electrolyte Secondary Battery]

Figure 5:
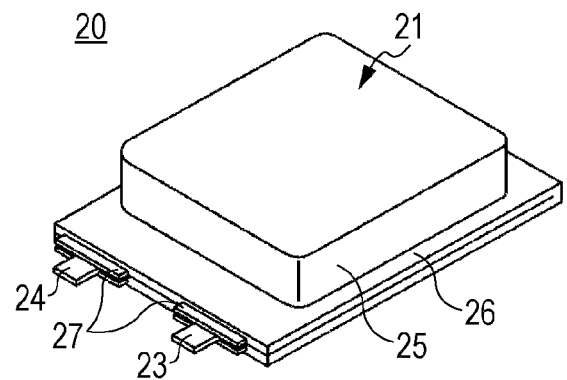
FIG. 5 is a perspective view of a laminate nonaqueous electrolyte secondary battery of one embodiment.
Figure 6:
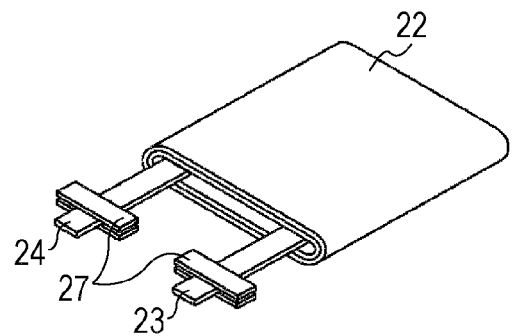
FIG. 6 is a perspective view of a wound electrode body shown in FIG. 5.

Next, evaluation of characteristics of the nonaqueous electrolyte secondary battery will be described. First, a method for manufacturing a nonaqueous electrolyte secondary battery of each of Experimental Examples 15 to 20 will be described with reference to FIGS. 5 and 6. A laminate nonaqueous electrolyte secondary battery 20 includes a laminate outer package body 21, a flat wound electrode body 22 having a positive electrode plate and a negative electrode plate, a positive electrode collector tab 23 connected to the positive electrode plate, and a negative electrode collector tab 24 connected to the negative electrode plate. The wound electrode body 22 has a positive electrode plate, a negative electrode plate, and at least one separator, each of which has a belt shape, and is configured so that the positive electrode plate and the negative electrode plate are wound in an electrically insulated state with the above separator provided therebetween.

A recess portion 25 is formed in the laminate outer package body 21, and one end side of this laminate outer package body 21 is folded so as to cover an opening portion of this recess portion 25. An end portion 26 around the recess portion 25 and a portion which faces the end portion 26 by folding are welded to each other, so that the inside of the laminate outer package body 21 is sealed. In the inside of the laminate outer package body 21 thus sealed, the wound electrode body 22 is received together with a nonaqueous electrolyte liquid.

The positive electrode collector tab 23 and the negative electrode collector tab 24 are each arranged to protrude from the sealed laminate outer package body 21 with a resin member 27 provided therebetween, and an electric power is to be supplied outside through the positive electrode collector tab 23 and the negative electrode collector tab 24 described above. Between the laminate outer package body 21 and each of the positive electrode collector tab 23 and the negative electrode collector tab 24, in order to improve the adhesion and to prevent short circuit through an aluminum alloy layer of a laminate material, the resin member 27 is provided.

[Formation of Positive Electrode Plate]

Except that the chemical stoichiometric ratio was changed in the preparation of the positive electrode active material described above, a positive electrode active material E and a positive electrode active material F were prepared in a manner similar to that of the above positive electrode active material A'. The molecular formula of the positive electrode active material E $LiCO_{0.33}Ni_{0.33}Mn_{0.33}O_2$ (Co:Ni:Mn=33:33:33), and the molecular formula of the positive electrode active material F $LiCO_{0.20}Ni_{0.50}Mn_{0.30}O_2$ (Co:Ni:Mn=20:50:30).

As the positive electrode active material of each of Experimental Examples 16 to 20, a positive electrode mixture slurry containing one of the positive electrode active material A (Experimental Example 16), the positive electrode active material B (Experimental Example 17), the positive electrode active material D (Experimental Examples 15 and 18), the positive electrode active material E (Experimental Example 19), and the positive electrode active material F (Experimental Example 20) was used, and a positive electrode plate was formed in a manner similar to that described above.

[Formation of Negative Electrode Plate]

A graphite, a carboxymethyl cellulose (CMC) functioning as a thickener, and a styrene butadiene rubber (SBR) functioning as a binder were weighed so as to have a mass ratio of 98:1:1 and were then dispersed in water, so that a negative electrode mixture slurry was prepared. After this negative electrode mixture slurry was applied by a doctor blade method to two surfaces of a copper-made negative electrode core body having a thickness of 8 μm, moisture was removed by drying at 110° C., so that negative electrode active material layers were formed. Next, rolling was performed using compression rollers to form a plate having a predetermined thickness. Subsequently, a negative electrode plate was formed by cutting to have a predetermined size.

[Preparation of Nonaqueous Electrolyte Liquid]

As a nonaqueous solvent, fluoroethylene carbonate (FEC), fluorinated propionic carbonate (FMP), ethylene carbonate (EC), and ethyl methyl carbonate (EMC) were prepared. In each of Experimental Examples 15 to 20, on the volume basis at 25° C., a mixture of FEC and FMP at a ratio of 30:70 (Experimental Examples 15 to 17) and a mixture of EC and EMC at a ratio of 30:70 (Experimental Examples 18 to 20) were prepared. Lithium hexafluorophosphate ($LiPF_6$) was dissolved in this nonaqueous solvent to have a concentration of 1 mol/L, so that a nonaqueous electrolyte was prepared.

[Formation of Nonaqueous Electrolyte Secondary Battery]

The positive electrode plate and the negative electrode plate formed as described above were wound with at least one separator of a polyethylene-made porous film provided therebetween, and a polypropylene-made tape was adhered to the outermost circumference, so that a cylindrical wound electrode body was formed. Next, this electrode body was pressed to form a flat wound electrode body. In addition, after a sheet-shaped laminate material having a five-layer structure containing a resin layer (polypropylene), an adhesive layer, an aluminum alloy layer, an adhesive layer, and a resin layer (polypropylene) was prepared, the laminate material was folded to form a bottom portion, and in addition, an electrode body receiving space having a cup shape was formed. Next, in a glove box in an argon atmosphere, the flat wound electrode body and the nonaqueous electrolyte were inserted in the electrode body receiving space having a cup shape. Subsequently, the pressure of the inside of the laminate outer package body was reduced so as to impregnate the nonaqueous electrolyte in the separator, and an opening portion of the laminate outer package body was sealed. As described above, a nonaqueous electrolyte secondary battery having a height of 62 mm, a width of 35 mm, and a thickness of 3.6 mm (the dimension excluding the sealing portion) was formed.

The theoretical capacity of each of those batteries is 800 mAh when the charge voltage is 4.5 V with reference to lithium.

Charge was performed at a constant current of 1 It (=800 mA) until the battery voltage reached 4.50 V (Experimental Examples 15 to 17) or 4.40 V (Experimental Examples 18 to 20), and after the battery voltage reached the target value described above, constant-voltage charge was performed at the above target value until the current reached 1/20 It=40 mA. In addition, discharge was performed at a constant current of 1 It=800 mA until the battery voltage reached 2.50 V, and the electrical quantity passing in this step was measured, so that a first discharge capacity was obtained. The potential of the graphite used for the negative electrode is approximately 0.10 V with reference to lithium. Hence, at a battery voltage of 4.50 V, the positive electrode potential with reference to lithium is approximately 4.6 V, such as 4.53 V or more, and at a battery voltage of 4.40 V, the positive electrode potential with reference to lithium is approximately 4.5 V, such as less than 4.53 V.

After charge and discharge were repeatedly performed under the same conditions as described above, a 100th discharge capacity was measured, and the capacity retention rate was obtained by the following equation. The results are collectively shown in Table 2.

Capacity retention rate (%)=(100th discharge capacity/first discharge capacity)×100 is high, such as 87% or more, the capacity retention rate of Experimental Example 15 has a low value of 57%. As the positive electrode active material, although nickel and manganese are contained as the substituent element source for cobalt in Experimental Examples 16 and 17, those elements are not contained in Experimental Example 15. Hence, it is found that even when the charge end voltage of the nonaqueous electrolyte secondary battery is set to 4.50 V, since a lithium cobalt composite oxide containing nickel and manganese as the substituent element source for cobalt is used as the positive electrode active material, the cycle characteristics is suppressed from being degraded.

When Experimental Example 18 in which a solid phase method is used is compared to Experimental Examples 19 and 20 in each of which a co-precipitation method is used, according to the co-precipitation method, as the content of cobalt in the lithium cobalt composite oxide is decreased, the capacity retention rate is decreased. On the other hand, according to Experimental Examples 8 to 10 in each of which a solid phase method is used, regardless of whether the content of cobalt in the lithium cobalt composite oxide is decreased or increased, the capacity retention rate is not changed. Accordingly, it is found that in the lithium cobalt composite oxide formed by a co-precipitation method, when cobalt is substituted by nickel and manganese, the cycle characteristics are degraded.

In addition, although examples of the laminate nonaqueous electrolyte secondary battery have been shown in the above Experimental Examples 15 to 20, besides the nonaqueous electrolyte secondary battery described above, the present invention may also be applied, for example, to a cylindrical nonaqueous electrolyte secondary battery and a square nonaqueous electrolyte secondary battery, each of which is formed using a metal outer package can.

In a charge discharge control system including at least one of the nonaqueous electrolyte secondary batteries of Experimental Examples 1 to 20, charge is performed until the

TABLE 2

| | Positive Electrode Active Material (Chemical Stoichiometric Ratio) | | | Nonaqueous Electrolyte (vol %) | | | | | Charge Voltage | Capacity Retention |
|---|---|---|---|---|---|---|---|---|---|---|
| | | Co | Ni | Mn | FEC | FMP | F-EMC | EC | EMC | (V vs. Graphite) | Rate (%) |
| Experimental Example 15 | D | 100 | 0 | 0 | 30 | 70 | 0 | 0 | 0 | 4.50 | 57 |
| Experimental Example 16 | A | 90 | 5 | 5 | 30 | 70 | 0 | 0 | 0 | 4.50 | 89 |
| Experimental Example 17 | B | 80 | 10 | 10 | 30 | 70 | 0 | 0 | 0 | 4.50 | 87 |
| Experimental Example 18 | D | 100 | 0 | 0 | 0 | 0 | 0 | 30 | 70 | 4.40 | 88 |
| Experimental Example 19 | E | 33 | 33 | 33 | 0 | 0 | 0 | 30 | 70 | 4.40 | 84 |
| Experimental Example 20 | F | 20 | 50 | 30 | 0 | 0 | 0 | 30 | 70 | 4.40 | 61 |

FEC: Fluoroethylene Carbonate
FMP: Fluorinated Methyl Propionate
F-EMC: Fluorinated Ethyl Methyl Carbonate
EC: Ethylene Carbonate
EMC: Ethyl methyl carbonate From the results shown in Table 2, the following can be found. When the results of Experimental Examples 15 to 17 are compared to each other, in the case in which the charge end voltage is set to 4.50 V (the positive electrode potential is 4.6 V with reference to lithium), although the capacity retention rate of each of Experimental Examples 16 and 17 potential of the positive electrode reaches 4.53 V or more or 4.55 V or more with reference to lithium.

In addition, in the above experimental examples, although the case in which nickel and manganese are used as the substituent element source for cobalt has been describe by way of example, besides the above elements, at least one type selected from the group consisting of calcium (Ca), copper (Cu), zinc (Zn), strontium (Sr), germanium (Ge), tin (Sn), silicon (Si), phosphorus (P), niobium (Nb), molybdenum (Mo), sulfur (S), and tungsten (W) may also be used.

The lithium cobalt composite oxide containing a substituent element source for cobalt is preferably represented by the formula of $Li_xCo_yM_{1-y}O_2$ ($0<x\leq1.5$, $0.5<y<1.0$), and M in the formula is preferably at least one type selected from the group consisting of Ni, Mn, Ca, Cu, Zn, Sr, Ge, Sn, Si, P, Nb, Mo, S, and W. In more preferable, as for x in the formula, $0.1\leq x\leq0.4$ holds. In addition, as for y in the formula, $0.70\leq y\leq0.94$ holds. When y is 0.70 or more, the filling property of the positive electrode active material and the discharge capacity are further suppressed from being degraded, and a battery having a higher capacity can be more easily realized. When y is 0.94 or less, if the charge potential of the positive electrode is 4.53 V or more with reference to lithium, the crystal structure is further stabilized. This lithium cobalt composite oxide more preferably contains one of Ni and Mn and further preferably contains Ni and Mn.

In addition, in the above experimental examples, the case in which as the rare earth element, erbium hydroxide is used has been described by way of example, as the rare earth element, besides the above element, at least one type selected from the group consisting of La, Ce, Pr, Nd, Sm, Eu, Gd, Tb, Dy, Hom Tmn, Yb, and Lu may also be used. Furthermore, at least one of Pr, Nd, and Er, each of which has a significant effect of suppressing the change in crystal structure caused by the phase transition, is preferably used. In addition, with respect to the lithium transition metal composite oxide, the amount of the rare earth element is 0.005 to 0.8 percent by mass and further preferably 0.01 to 0.5 percent by mass. When the amount is less than 0.005 percent by mass, the effect of improving the cycle characteristics is small, and when the amount is more than 0.8 percent by mass, discharge rate characteristics are degraded.

As a method to adhere the above rare earth compound to a part of the surface of the positive electrode active material, for example, there may be mentioned a method in which a solution dissolving a rare earth compound is mixed with a solution in which the positive electrode active material powder mentioned above is dispersed; and a method in which while the positive electrode active material powder is mixed, a solution containing a rare earth compound is sprayed.

By the use of the method as described above, a hydroxide of the above rare earth element can be adhered to a part of the surface of the positive electrode active material. In addition, when the positive electrode active material is heat treated, the rare earth hydroxide adhered to a part of the surface is changed into a rare earth oxyhydroxide.

As a rare earth compound to be dissolved in a solution which is used when the rare earth hydroxide is adhered, for example, a rare earth acetate, a rare earth nitrate, a rare earth sulfate, a rare earth oxide, or a rare earth chloride may be used.

In this case, as the above rare earth compound, a rare earth hydroxide or a rare earth oxyhydroxide is preferable. That is, no rare earth oxide is preferably contained. The reason for this is as described below.

When a material having a surface to which a rare earth hydroxide is adhered is heat treated, an oxyhydroxide or an oxide is formed. However, in general, although a temperature at which a rare earth hydroxide or a rare earth oxyhydroxide is stably formed into an oxide is 500° C. or more, when the heat treatment is performed at the temperature as described above, a rare earth compound adhered to the surface may be partially diffused into the positive electrode active material. As a result, it is believed that the effect of suppressing the change in crystal structure of the surface of the positive electrode active material may be degraded in some cases.

As the negative electrode active material, for example, a material containing one of a carbon material, silicon (Si), and a silicon oxide ($SiO_x$, $0.5\leq x<1.6$) or a material containing a mixture thereof may be used. As the carbon material, for example, natural graphite, artificial graphite, carbon black, cokes, glassy carbon, or carbon fibers may be used, and alternatively, sintered bodies formed from the materials mentioned above may be used alone, or at least two types thereof may also be used by mixing.

As the nonaqueous solvent of the nonaqueous electrolyte, for example, there may be used a fluorinated solvent, such as fluoroethylene carbonate (FEC), a fluorinated methyl propionate (FMP), or a fluorinated ethyl methyl carbonate (F-EMC); a cyclic carbonate ester, such as ethylene carbonate (EC), propylene carbonate (PC), butylene carbonate (BC), or ethyl methyl carbonate (EMC); a fluorinated cyclic carbonate ester; a lactone (cyclic carbonic acid ester), such as γ-butyrolactone (γ-BL) or γ-valerolactone (γ-VL); a chain carbonate ester, such as dimethyl carbonate (DMC), ethyl methyl carbonate (EMC), diethyl carbonate (DEC), methyl propyl carbonate (MPC), or dibutyl carbonate (DBC); a chain carbonic acid ester, such as methyl pivalate, ethyl pivalate, methyl isobutyrate, or methyl propionate; an amide compound, such as N,N'-dimethylformamide or N-methyl oxazolidinone; a sulfur compound such as sulfolane; or an ambient temperature molten salt such as 1-ethyl-3-methyl imidazolium tetrafluoroborate. In addition, at least two types of those compounds mentioned above may be used by mixing.

The nonaqueous electrolyte preferably contains a fluorinated solvent. By the presence of this fluorinated solvent, the change in structure of the positive electrode caused by charge and discharge performed at a high potential can be suppressed. The reason for this is believed that when a fluorine atom is introduced in a nonaqueous electrolyte solvent, oxidation decomposition of the nonaqueous electrolyte is suppressed, and since the ion conductivity is also appropriately decreased, the reaction overvoltage during charge is increased. The nonaqueous electrolyte more preferably contains as the fluorinated solvent, one of fluoroethylene carbonate, fluorinated methyl propionate, and fluorinated methyl ethyl carbonate. The nonaqueous electrolyte further preferably contains 50 percent by volume or more of a fluorinated solvent with respect to this nonaqueous electrolyte.

As an electrolyte salt to be dissolved in the nonaqueous solvent in the nonaqueous electrolyte, a lithium salt which is generally used as an electrolytic salt in a nonaqueous electrolyte secondary battery may be used. As the lithium salt described above, for example, lithium hexafluorophosphate ($LiP_6$), $LiBF_4$, $LICF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$ may be used alone, or at least two types thereof may be used by mixing.

To the nonaqueous electrolyte, as an electrode stabilizing compound, for example, there may be added vinylene carbonate (VC), adiponitrile (AdpCN), vinyl ethyl carbonate (VEC), succinic anhydride (SUCAH), maleic anhydride (MAAH), glycolic anhydride, ethylene sulfite (ES), divinyl sulfone (VS), vinyl acetate (VA), vinyl pivalate (VP), catechol carbonate, or biphenyl (BP). At least two types of those compounds may also be appropriately used by mixing.

In addition, in Experimental Examples 15 to 20, the positive electrode active material and the negative electrode active material are contained so that the charge capacity ratio of the negative electrode to the positive electrode obtained when charge is performed until the positive electrode potential reaches 4.53 to 4.60 V (vs. Li/Li$^+$) is 1.0 to 1.2.

INDUSTRIAL APPLICABILITY

The present invention can be applied to nonaqueous electrolyte secondary battery fields.

REFERENCE SIGNS LIST

10 monopolar cell, 11 positive electrode, 12 negative electrode, 13 separator, 14 measurement bath, 15 reference electrode, 16 reference electrode bath, 17 capillary tube, nonaqueous electrolyte liquid, 20 nonaqueous electrolyte secondary battery, 21 laminate outer package body, 22 wound electrode body, 23 positive electrode collector tab, 24 negative electrode collector tab, 25 recess portion, 26 end portion, 27 resin member

The invention claimed is:
1. A nonaqueous electrolyte secondary battery comprising:
   a positive electrode including a positive electrode active material which absorbs and releases lithium ions;
   a negative electrode including a negative electrode active material which absorbs and releases lithium ions; and
   a nonaqueous electrolyte,
   wherein the positive electrode active material includes a lithium cobalt composite oxide having a crystal structure of O3 structure,
   the positive electrode active material has a surface to which a rare earth compound is partially adhered, and
   the potential of the positive electrode is 4.53 V to 4.60 V with reference to lithium,
   wherein the lithium cobalt composite oxide is represented by the formula of Li$_x$Co$_y$M$_{1-y}$O$_2$ (0<x≤1.5, 0.5<y<1.0, and M is Ni and Mn and optionally one or more selected from the group consisting of Ca, Cu, Zn, Sr, Ge, Sn, Si, P, Nb, Mo, S, and W),
   wherein a molar ratio of M at a surface of the lithium cobalt composite oxide is larger than a molar ratio of M at an inside of the lithium cobalt composite oxide, and
   wherein the rare earth compound includes at least one type of erbium hydroxide and erbium oxyhydroxide.

2. The nonaqueous electrolyte secondary battery according to claim 1,
   wherein the positive electrode active material is synthesized by a solid phase method.

3. The nonaqueous electrolyte secondary battery according to claim 1,
   wherein the nonaqueous electrolyte contains a fluorinated solvent,
   wherein the fluorinated solvent is at least one type selected from the group consisting of fluoroethylene carbonate, fluorinated methyl propionate, and fluorinated methyl ethyl carbonate, and
   wherein the content of fluorinated solvent is 50-80 percent by volume with respect to the total nonaqueous solvent.

\* \* \* \* \*